(12) United States Patent
Bratkovski et al.

(10) Patent No.: US 7,308,163 B2
(45) Date of Patent: Dec. 11, 2007

(54) PHOTONIC CRYSTAL SYSTEM AND METHOD OF CONTROLLING/DETECTING DIRECTION OF RADIATION PROPAGATION USING PHOTONIC CRYSTAL SYSTEM

(75) Inventors: Alexandre M. Bratkovski, Mountain View, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/125,135

(22) Filed: May 10, 2005

(65) Prior Publication Data

US 2006/0257067 A1     Nov. 16, 2006

(51) Int. Cl.
*G02B 6/00* (2006.01)
(52) U.S. Cl. .......................................... 385/12; 385/13
(58) Field of Classification Search ................. 385/12, 385/13
See application file for complete search history.

(56) References Cited

U.S. PATENT DOCUMENTS

| 6,588,945 | B2 * | 7/2003 | Hammond et al. | 385/88 |
| 2002/0135863 | A1 * | 9/2002 | Fukshima et al. | 359/298 |
| 2004/0008934 | A1 * | 1/2004 | Takiguchi et al. | 385/27 |
| 2004/0067163 | A1 * | 4/2004 | Prasad et al. | 422/58 |
| 2005/0030611 | A1 * | 2/2005 | Fukshima et al. | 359/321 |
| 2006/0198567 | A1 * | 9/2006 | Levy et al. | 385/12 |

FOREIGN PATENT DOCUMENTS

WO    WO 2004031820 A1 *  4/2004

OTHER PUBLICATIONS

A. MacLean et al., "Detection of Solvents using a Distributed Fibre Optic Sensor", Electron. Lett., vol. 39, No. 17, (2003), pp. 1237-1238.
A. MacLean et al., "Detection of hydrocarbon fuel spills using a distributed fibre optic sensor", Sensors and Actuators A 109 (2003), pp. 60-67.
H. Kosaka et al., "Superprism phenomena in photonic crystals", Phys. Rev. B, vol. 58, No. 16, Oct. 15, 1998, pp. R10 096-R10 099.
A. Berrier et al., "Negative Refraction at Infrared Wavelengths in a Two-Dimensional Photonic Crystal", Phys. Rev. Lett., vol. 93, No. 7, Aug. 13, 2004, pp. 073902-1-073902-4
M. Notomi, "Theory of light propagation in strongly modulated photonic crystals: Refractionlike behavior in the vicinity of the photonic band gap", Phys. Rev. B, vol. 62, No. 16, Oct. 15, 2000, pp. 10 696-1- 705.

* cited by examiner

*Primary Examiner*—Sarah Song

(57) ABSTRACT

A photonic crystal system and a method for controlling the direction of radiation propagation are disclosed. The photonic crystal system includes a photonic crystal and a deformation source positioned to deform the photonic crystal. The photonic crystal system optionally includes a radiation source that emits radiation at a frequency within a frequency range over which the photonic crystal exhibits a negative index of refraction.

32 Claims, 2 Drawing Sheets

PHOTONIC CRYSTAL SYSTEM AND METHOD OF CONTROLLING/DETECTING DIRECTION OF RADIATION PROPAGATION USING PHOTONIC CRYSTAL SYSTEM

BACKGROUND

Photonic crystals (PhCs) are artificially-manufactured, multi-dimensional periodic structures whose refractive index is periodically spatially modulated and the resultant photonic dispersion shows a band nature reminiscent to the electronic band structure in a solid. It has been reported that the light propagation direction in photonic crystals can become very sensitive to the incident angle and wavelength of radiation and produce "superprism" effects. Light path swings of from +70° to −70° and negative bending (i.e., negative refraction) have been observed as a result of a slight change of the incident angle of radiation from +7° to −7°.

Negative refraction in photonic crystals has been experimentally demonstrated at microwave wavelengths. The experimental demonstration of light focusing due to negative refraction by a two-dimensional photonic crystal at shorter infrared (telecommunication) wavelengths has been reported.

However, it would be desirable to have a device that can solve problems, such as control of radiation at distances that are close to the wavelength of the radiation.

SUMMARY

An exemplary embodiment of a photonic crystal system comprises a photonic crystal having a negative index of refraction over a frequency range of incident radiation, and a deformation source positioned in a fixed relationship with the photonic crystal to deform the photonic crystal.

Another exemplary embodiment of a photonic crystal system comprises a photonic crystal having a negative index of refraction over a frequency range of incident radiation; and means positioned in a fixed relationship with the photonic crystal for deforming the photonic crystal.

An exemplary embodiment of a method for controlling the direction of radiation propagation comprises irradiating a photonic crystal with radiation within a frequency range over which the photonic crystal has a negative index of refraction, and simultaneously deforming the photonic crystal via a deformation source positioned in a fixed relationship with the photonic crystal.

DETAILED DESCRIPTION

Figure 1A:
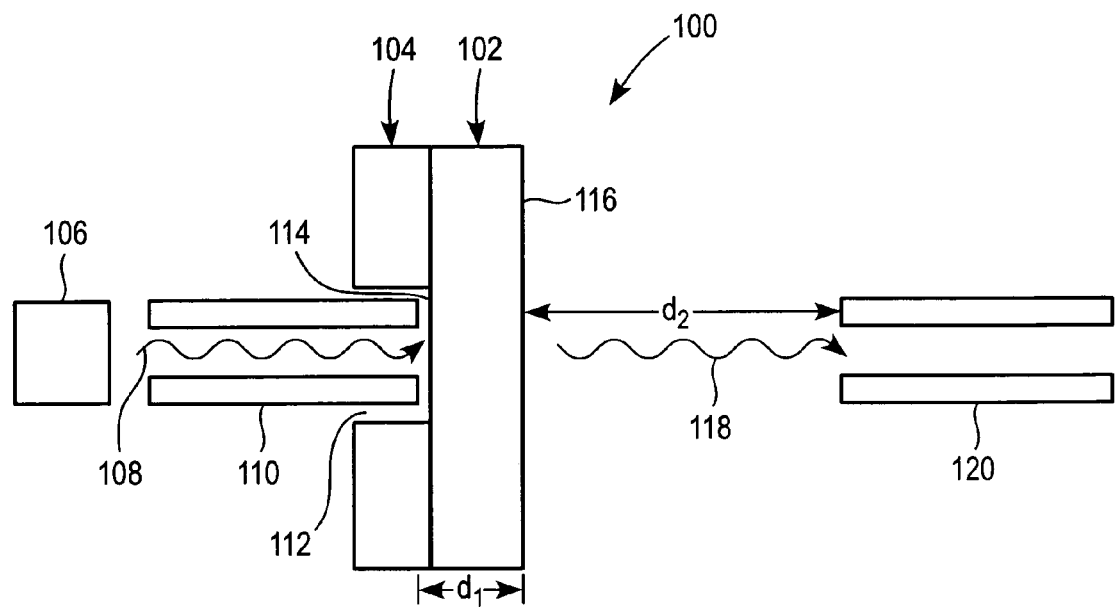
FIG. 1A shows an exemplary embodiment of a photonic crystal system including a deformation source that can be deformed by a stimulus, with the deformation source and photonic crystal being in a non-deformed condition.

FIG. 1A shows an exemplary embodiment of a photonic crystal system 100. The photonic crystal system 100 includes a photonic crystal 102 and a deformation source 104 positioned in a fixed relationship with the photonic crystal 102. As described in greater detail below, the deformation source 104 can be deformed by a stimulus, which in turn deforms the photonic crystal 102. Deformation of the photonic crystal 102 causes the deflection of radiation refracted by the photonic crystal 102. The photonic crystal 102 can be integrally formed on the deformation source 104 (substrate), provided on a common substrate with the deformation source 104, or positioned in any other fixed relationship with respect to the deformation source 104, to deform the photonic crystal 102. The photonic crystal system 100 preferably can achieve a repeatable, or desired, deformation in response to a given stimulus.

The photonic crystal 102 and the deformation source 104 are shown in a non-deformed condition in FIG. 1A. As shown in FIG. 1A, the photonic crystal system 100 can include an optional radiation source 106 and an operably associated input waveguide 110, e.g., an optical fiber. The radiation source 106 is operable to emit electromagnetic radiation 108 of a desired frequency or frequency range. The input waveguide 110 is positioned with respect to a window 112 in the deformation source 104. The photonic crystal 102 is disposed on the window 112. The input waveguide 110 confines and guides the radiation 108 emitted by the radiation source 106. The radiation 108 is typically at normal incidence to the inlet surface 114 of the photonic crystal 102 when the photonic crystal is non-deformed.

The photonic crystal system 100 optionally can include a collecting waveguide 120, e.g., an optical fiber, positioned to collect radiation 118 from the photonic crystal 102. The collecting waveguide 120 confines and guides the radiation 118. The input waveguide 110 is separated from the collecting waveguide by a total distance equal to the sum of the distances $d_1$ and $d_2$, as shown in FIG. 1A. In an exemplary embodiment, the total distance is less than about 1000 nm. In another exemplary embodiment, the total distance is from about 400 nm to about 800 nm, i.e., approximately within the wavelength range of visible light. Positioning the input waveguide 110 and collecting waveguide 120 in this manner can achieve "near-field" imaging, i.e., imaging at distances approximating the wavelength of the incident radiation (e.g., visible light or infrared radiation). Photonic crystals can simultaneously exhibit negative effective values of electric permittivity, $\epsilon$, and magnetic permeability, $\mu$, for focusing features smaller than the wavelength, $\lambda$.

The photonic crystal system 100 can include a suitable device coupled to the collecting waveguide 120 to collect the radiation. For example, the device can be a detector that is operably compatible with the particular wavelength of radiation emitted by the radiation source 106, e.g., ultraviolet (UV) radiation, visible light, infrared radiation, or microwaves.

The photonic crystal 102 has a composition and structure that can exhibit a negative index of refraction over a frequency range of incident radiation emitted by the radiation source 106. The photonic crystal 102 and radiation source 106 can be matched to provide a negative index of refraction by the photonic crystal 102 over a selected frequency range.

The photonic crystal 102 can be any suitable two-dimensional or three-dimensional photonic crystal that exhibits a negative index of refraction over a desired frequency range (or wavelength range) of incident radiation emitted by the radiation source 106. For example, the photonic crystal 102 can be a two-dimensional photonic crystal structure comprised of a lattice, e.g., a triangular lattice, of air holes in a slab. For example, the slab can be comprised of a low-index contrast InP/GaInAsP/InP, or of another suitable composition. For an ultraviolet radiation source, it is contemplated that diamond can be used for the photonic crystal. For the photonic crystal 102, one or more of the composition, hole structure (i.e., hole size, shape, orientation and/or arrangement), indices of refraction of the layers, number of layers, size of the layers, and overall size of the photonic crystal can be selectively varied depending on the desired application and performance characteristics of the photonic crystal system 100.

The photonic crystal 102 can be provided in a fixed relationship to the deformation source 104 by any suitable fabrication technique. For example, the photonic crystal 102 can be grown on the deformation source 104 (substrate) by a thin film deposition technique, such as sputter deposition, chemical vapor deposition (CVD), spray pyrolysis (i.e., pyrolytic deposition), atmospheric pressure CVD (APCVD), low-pressure CVD (LPCVD), plasma-enhanced CVD (PECVD), plasma assisted CVD (PACVD), thermal or electron-beam evaporation, cathodic arc deposition, plasma spray deposition, or wet chemical deposition (e.g., sol-gel). Available lithography techniques (i.e., pattern and etch processes) can also be used during formation of the photonic crystal 102. For example, the photonic crystal 102 can be fabricated by chemically-assisted ion beam etching in the InP system.

In the embodiment shown in FIG. 1A, the deformation source 104 is comprised of a material that deforms when exposed to an external stimulus. The stimulus acts as a deformation means for deforming the deformation source 104. As shown in FIG. 1A, when the deformation source 104 is not exposed to the stimulus, the deformation source 104 is not deformed, and the photonic crystal 102 provided on the deformation source 104 is also not deformed. In the non-deformed condition, the photonic crystal 102 focuses the radiation 118 from the photonic crystal 102 for collection by the collecting wave guide 120.

The direction of radiation, e.g., light, refracted by the photonic crystal 102 is sensitive to the geometry of the incident radiation and that of the photonic crystal 102. A deformation of the photonic crystal 102 translates into a deflection of the refracted radiation, which can change the intensity of the radiation delivered to a collector. This deflection is based on the superprism effect described herein.

Figure 1B:
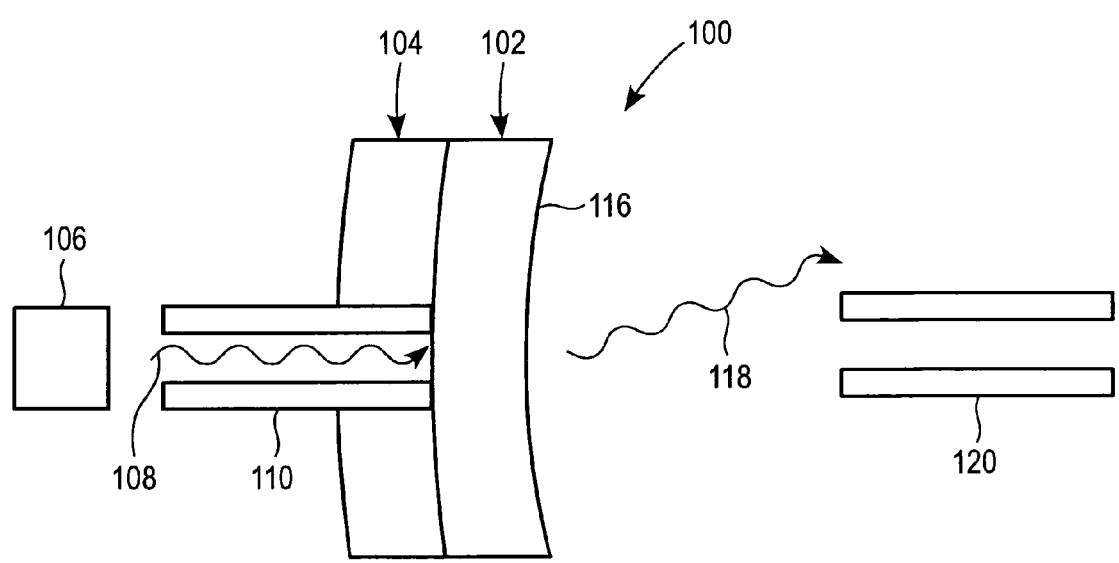
FIG. 1B shows the photonic crystal system of FIG. 1A with the deformation source and photonic crystal in a deformed condition after the substrate has been subjected to the stimulus.

For example, as shown in FIG. 1B, when the deformation source 104 is exposed to a certain stimulus that causes the deformation source 104 to deform, the deformation source 104 deforms and consequently causes the photonic crystal 102 to deform. As a result of the photonic crystal 102 deforming, radiation 118 from the photonic crystal 102 is deflected away from the collecting wave guide 120 and the intensity of the radiation delivered to the collecting waveguide 120 is changed.

In an exemplary embodiment, the deformation source 104 can be made of a material that swells and increases in volume when exposed to one or more selected chemicals. For example, polymeric compounds are known that absorb moisture and, as a result, swell when exposed to a humid environment. This type of swelling is referred to as hygroscopic swelling. The degree of swelling of such polymeric compounds when exposed to a humid environment increases with increasing hygroscopic swelling coefficient.

As another example, some liquid-swelling polymers, such as butyl rubber, ethyl-propyl-diene monomer and silicone-based polymers, can be used to detect hydrocarbon fuels. Some liquid-swelling silicone polymers can be used to detect solvents including toluene, cyclohexane, chloroform, petroleum ether and dichloromethane.

Accordingly, the composition of the deformation source 104 can be selected based on the particular chemical(s) whose presence in an environment is desired to be detected by the photonic crystal system 100. Thus, the photonic crystal system 100 can be used as a chemical sensor for detecting the presence of one or more selected chemical(s).

In another embodiment, the deformation source 104 can be made of a material that has a sufficiently high coefficient of thermal expansion to deform when the deformation source 104 is exposed to a temperature change equal to at least a minimum value, thereby causing the photonic crystal 102 to also deform. For example, the deformation source 104 can be comprised of a suitable metal, such as aluminum, aluminum alloys, tin, tin alloys, silver, or copper that has a sufficiently high coefficient of thermal expansion. Accordingly, this embodiment of the photonic crystal system 100 can be used as a temperature sensor.

In another embodiment, the deformation source 104 can be made of a material that deforms when subjected to applied physical stress, such as one or more of vibration, tension, compression, bending or torsion. Accordingly, this embodiment of the photonic crystal system 100 can be used as a stress sensor.

Figure 2A:
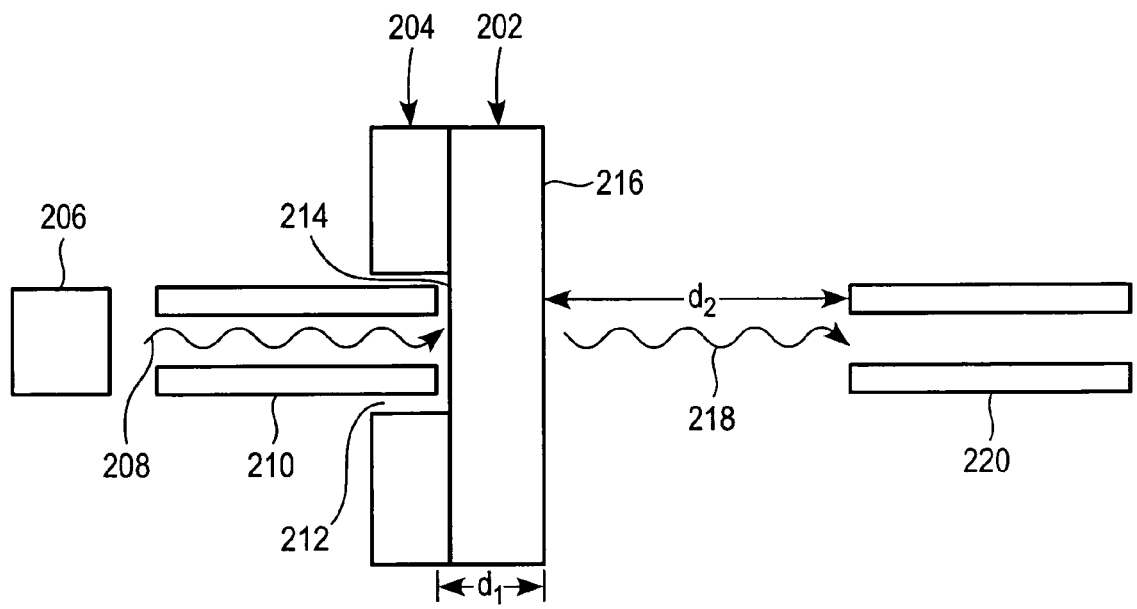
FIG. 2A shows another exemplary embodiment of a photonic crystal system including a piezoelectric deformation source, with the deformation source and photonic crystal being in a non-deformed condition.
Figure 2B:
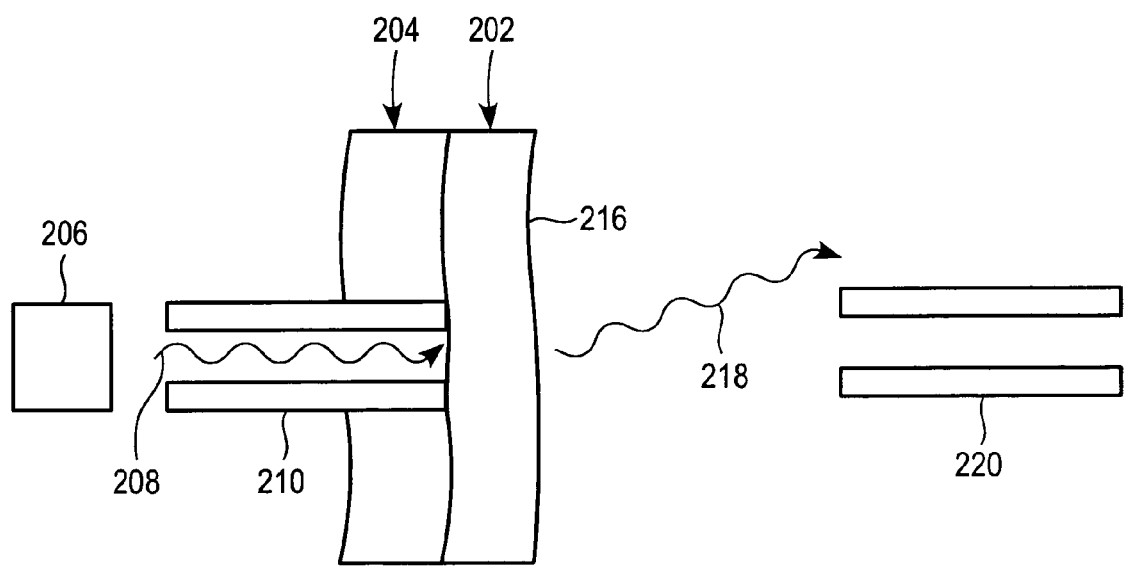
FIG. 2B shows the photonic crystal system of FIG. 2A with the deformation source and photonic crystal in a deformed condition.

FIGS. 2A and 2B show another exemplary embodiment of a photonic crystal system 200. The photonic crystal system 200 includes a photonic crystal 202 provided on a deformation source 204 (substrate). The photonic crystal system 200 can include an optional radiation source 206 operable to emit electromagnetic radiation 208, an input waveguide 210 positioned to extend into a window 212 formed in the deformation source 204, and a collecting waveguide 220 positioned to collect radiation 218 from the photonic crystal 202.

The deformation source 204 is a piezoelectric structure, such as a piezo transducer or a piezo actuator in contact with the photonic crystal 202, which is operable at a frequency effective to induce a deformation wave in the photonic crystal 202. The photonic crystal 202 and the deformation source 204 are shown in a non-deformed condition in FIG. 2A, in which the radiation 218 is deflected.

Deformation (and optionally also rotation) of the photonic crystal 202 causes the deflection of radiation refracted by the photonic crystal 202, as depicted in FIG. 2B. Accordingly, the deformation source 204 can modulate, e.g., a main optical beam, by using the superprism effect. The photonic crystal system 200 can be used, e.g., in an acoustic optical modulator. The piezoelectric structure can vibrate at a frequency of from about 1 GHz to about 12 GHz. Collection of the radiation 218 by the collecting wave guide 220 achieves a switch effect, by which process radiation is deflected from the collecting wave guide 220 and the intensity of propagating radiation decreases.

As described above, the photonic crystal system is used with a radiation source positioned to irradiate the photonic crystal with radiation within the frequency range. The radiation source can include any suitable means for irradiating the photonic crystal with radiation of a frequency within a frequency range over which the photonic crystal exhibits a negative index of refraction. Regarding visible radiation, an exemplary radiation source that can be used is a laser. Lasers can emit high intensity, monochromatic radiation. Exemplary lasers that can be used as the radiation source include gas lasers, such as helium-neon, nitrogen, argon ion and krypton ion lasers; solid state lasers, such as ruby lasers or neodymium-yttrium-aluminum-garnet (Nd-YAG) lasers; dye lasers; and diode lasers. Ultraviolet, infrared and microwave radiation sources can also be used in other embodiments of the photonic crystal system including a suitable photonic crystal depending on the radiation source.

Optional waveguides provided in the photonic crystal system can be made of suitable materials and have suitable constructions to confine and guide propagating electromagnetic waves of the radiation emitted by the radiation source. The composition and construction of the waveguides can be selected based on the particular wavelength range of radiation that is emitted by the radiation source. For example, in the microwave regime, the waveguide can typically be made of a hollow metallic conductor, usually rectangular, elliptical, or circular in cross section. In the infrared regime, a ridge waveguide structure, such as low-index contrast planar waveguide comprised of InP/GaInAsP/InP or the like, can be used. In the optical regime, the waveguide can be made of a dielectric material, such as an optical fiber with a circular cross section.

Methods for controlling the direction of radiation propagation are also provided. An embodiment of the methods comprises irradiating a photonic crystal with radiation within a frequency range over which the photonic crystal has a negative index of refraction, and simultaneously deforming the photonic crystal via a deformation source positioned in a fixed relationship with the photonic crystal to deform the photonic crystal. As described above, by deforming the deformation source by exposure to a stimulus, the incident radiation, e.g., light, can be deflected in a desired manner from the photonic crystal.

In an embodiment of the methods, the photonic crystal can be deformed by exposure to a stimulus, such as a chemical, a temperature change, or an applied physical stress. In another embodiment of the methods, the photonic crystal can be deformed by a piezoelectric structure. The piezoelectric structure can be used to acoustically modulate the photonic crystal at a selected frequency to modulate the signal from the photonic crystal.

Accordingly, exemplary embodiments of the photonic crystal system can be provided that can control radiation (i.e., by deflection or modulation) at short distances that can approximate the wavelength of incident radiation. In the photonic crystal system, an incident beam can address an increased number of receiving ports, and achieve improvements, such as in the sensitivity of sensors and the efficiency of modulators. The photonic crystal system can use more power sent down the main fiber and use the power for more channels. Overall power efficiency can be improved by the photonic crystal system.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A sensor, comprising:
   a photonic crystal having a negative index of refraction over a frequency range of radiation incident on the photonic crystal;
   a non-piezoelectric deformation source comprising a substrate positioned in contact with the photonic crystal, wherein the substrate is comprised of a material that deforms when exposed to a stimulus so as to deform the photonic crystal; and
   a detector positioned to collect radiation from the photonic crystal to sense exposure of the deformation source to the stimulus.

2. The sensor of claim 1, wherein the photonic crystal is two-dimensional or three-dimensional.

3. The sensor of claim 1, wherein:
   the sensor is a chemical sensor;
   the substrate is comprised of a material that deforms when exposed to one or more selected chemicals; and
   the detector collects radiation from the photonic crystal to sense exposure of the deformation source to the one or more chemicals.

4. The sensor of claim 3, wherein the substrate is comprised of a polymeric material that swells and increases in volume when exposed to the one or more selected chemicals.

5. The sensor of claim 1, wherein:
   the sensor is a temperature sensor;
   the substrate is comprised of a material that deforms when exposed to a temperature change equal to at least a minimum value; and
   the detector collects radiation from the photonic crystal to sense exposure of the deformation source to the temperature change.

6. The sensor or claim 5, wherein the substrate is comprised of a metal.

7. The sensor of claim 1, wherein:
   the sensor is a stress sensor;
   the substrate is comprised of a material that deforms when a physical stress is applied to the substrate; and
   the detector collects radiation from the photonic crystal to sense exposure of the deformation source to the physical stress.

8. The sensor of claim 1, comprising:
   a radiation source positioned to irradiate the photonic crystal with radiation within the frequency range.

9. The sensor of claim 8, comprising:
   an input waveguide positioned to guide radiation emitted by the radiation source onto the photonic crystal; and
   a collecting waveguide positioned to collect and guide radiation from the photonic crystal.

10. The sensor of claim 9, wherein the input waveguide is separated from the collecting waveguide by a distance of less than about 1000 nm.

11. The sensor of claim 9, wherein the input waveguide is separated from the collecting waveguide by a distance of from about 500 nm to about 800 nm.

12. The sensor of claim 9, wherein the radiation source emits light and each of the input waveguide and the collecting waveguide is an optical fiber.

13. The sensor of claim 1, wherein the photonic crystal is grown on the substrate by a thin film deposition technique.

14. A photonic crystal system, comprising:
   a photonic crystal having a negative index of refraction over a frequency range of radiation incident on the photonic crystal; and
   a non-piezoelectric deformation source comprising a substrate including a first surface positioned in contact with the photonic crystal and a second surface exposed to an external environment, wherein the substrate is comprised of a material that deforms when exposed to a stimulus present in the external environment so as to deform the photonic crystal.

15. The photonic crystal system of claim 14, wherein the substrate is comprised of a material that deforms (i) when exposed to one or more selected chemicals, (ii) when exposed to a temperature change equal to at least a minimum value, or (iii) when a physical stress is applied to the substrate.

16. The photonic crystal system of claim 14, wherein the photonic crystal is grown on the first surface of the substrate by a thin film deposition technique.

17. A sensor comprising:
the photonic crystal system of claim 14; and
a detector positioned to collect radiation from the photonic crystal to sense exposure of the deformation source to the stimulus.

18. The photonic crystal system of claim 14, comprising:
a radiation source positioned to irradiate the photonic crystal with radiation having the frequency within the frequency range.

19. The photonic crystal system of claim 14, comprising:
a collecting waveguide positioned to collect radiation emitted from the photonic crystal.

20. The photonic crystal system of claim 14, wherein the radiation incident on the photonic crystal passes through an input waveguide positioned in an opening extending through the substrate.

21. The photonic crystal system of claim 14, comprising:
a radiation source positioned to irradiate the photonic crystal with radiation within the frequency range;
an input waveguide positioned to guide radiation emitted by the radiation source onto the photonic crystal; and
a collecting waveguide positioned to collect and guide radiation from the photonic crystal;
wherein the input waveguide is separated from the collecting waveguide by a distance of less than about 1000 nm.

22. The photonic crystal system of claim 14, wherein the substrate is comprised of a polymeric material that swells and increases in volume when exposed to the one or more selected chemicals.

23. The photonic crystal system of claim 14, wherein the substrate is comprised of a metal.

24. A method for controlling the direction of radiation propagation, comprising:
irradiating a photonic crystal with radiation within a frequency range over which the photonic crystal has a negative index of refraction;
simultaneously deforming the photonic crystal via a non-piezoelectric deformation source comprising a substrate positioned in contact with the photonic crystal, wherein the substrate is comprised of a material that is deformed by exposure to a stimulus so as to deform the photonic crystal; and
collecting radiation from the photonic crystal with a detector to sense exposure of the deformation source to the stimulus.

25. The method of claim 24, wherein the stimulus is a chemical that causes deformation of the substrate, and the radiation is collected from the photonic crystal with the detector to sense exposure of the deformation source to the chemical.

26. The method of claim 24, wherein the stimulus is a temperature change of the substrate of at least a minimum value, and the radiation is collected from the photonic crystal with the detector to sense exposure of the deformation source to the temperature change.

27. The method of claim 24, wherein the stimulus is a physical stress applied to the substrate, and the radiation is collected from the photonic crystal with the detector to sense exposure of the deformation source to the physical stress.

28. The method of claim 24,
wherein the substrate is deformed by (i) exposure to one or more selected chemicals, (ii) exposure to a temperature change equal to at least a minimum value, or (iii) an applied physical stress; and
the radiation from the photonic crystal is detected to sense exposure of the deformation source to the stimulus.

29. The method of claim 24, comprising:
positioning an input waveguide to guide radiation emitted by a radiation source onto the photonic crystal; and
positioning a collecting waveguide to collect and guide radiation from the photonic crystal.

30. The method claim 29, wherein the input waveguide is separated from the collecting waveguide by a distance approximately equal to a wavelength of the radiation.

31. A method for controlling the direction of radiation propagation, comprising:
irradiating a photonic crystal with radiation within a frequency range over which the photonic crystal has a negative index of refraction; and
simultaneously deforming the photonic crystal via a non-piezoelectric deformation source comprising a substrate including a first surface positioned in contact with the photonic crystal and a second surface exposed to an external environment, wherein the substrate is comprised of a material that is deformed when exposed to a stimulus present in the external environment so as to deform the photonic crystal.

32. The method of claim 31, wherein the radiation is passed through an input waveguide positioned in an opening extending through the substrate to irradiate the photonic crystal.

* * * * *